United States Patent
Donelson et al.

(10) Patent No.: US 6,474,499 B2
(45) Date of Patent: Nov. 5, 2002

(54) CONTAINER BASE CUP HAVING REDUCED HEAT GAIN

(75) Inventors: Michael E. Donelson, Gray; Lawrence A. Coppari, Kingsport; Stephen A. Weinhold, Kingsport; Marcus D. Shelby, Kingsport; Steven S. Duncan, Fall Branch; Robert N. Estep, Kingsport, all of TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/846,269

(22) Filed: May 2, 2001

(65) Prior Publication Data

US 2001/0038014 A1 Nov. 8, 2001

Related U.S. Application Data (60) Provisional application No. 60/201,440, filed on May 3, 2000.

(51) Int. Cl.[7] .................................................. B32B 15/00
(52) U.S. Cl. .................. 220/592.21; 428/457; 428/458; 428/285; 428/450; 428/432; 428/417; 220/636
(58) Field of Search ............................ 220/592.21, 636; 428/457, 458, 285, 400, 432, 417

(56) References Cited

U.S. PATENT DOCUMENTS

| | | | |
|---|---|---|---|
| 3,048,294 A | * | 8/1962 | Osborn et al. .......... 220/592.21 |
| 3,238,002 A | * | 3/1966 | O'Connell et al. .... 220/592.21 |
| 3,779,298 A | | 12/1973 | Piccirilli et al. |
| 3,916,048 A | | 10/1975 | Walles |
| 3,921,844 A | | 11/1975 | Walles |
| 3,993,811 A | | 11/1976 | Walles |
| 4,241,839 A | | 12/1980 | Alberghini |
| 4,393,665 A | | 7/1983 | Gardner et al. |
| 4,438,856 A | | 3/1984 | Chang |
| 4,457,977 A | | 7/1984 | Walles |
| 4,581,285 A | * | 4/1986 | Mahefkey, Jr. ......... 220/592.21 |
| 4,731,266 A | | 3/1988 | Bonnebat et al. |
| 4,760,949 A | | 8/1988 | Elias |
| 4,865,891 A | | 9/1989 | Larsson |
| 4,867,214 A | | 9/1989 | Fuller |
| 4,871,597 A | | 10/1989 | Hobson |
| 5,223,315 A | | 6/1993 | Katsura et al. |
| 5,316,193 A | | 5/1994 | Heiberger |
| 5,474,820 A | | 12/1995 | Murschall et al. |
| 5,490,631 A | | 2/1996 | Iioka et al. |
| 5,494,198 A | | 2/1996 | Heiberger |
| 5,678,725 A | * | 10/1997 | Yamada et al. ......... 220/592.21 |
| 5,798,154 A | | 8/1998 | Bryan |
| 5,888,640 A | | 3/1999 | Marotta et al. |

FOREIGN PATENT DOCUMENTS

| | | |
|---|---|---|
| DE | 69 45 265 | 5/1970 |
| EP | 0 583 680 | 2/1994 |

\* cited by examiner

*Primary Examiner*—Joseph M. Moy
(74) *Attorney, Agent, or Firm*—Staas & Halsey LLP

(57) ABSTRACT

Base cup for receiving a container body bottom and for reducing heat gain to fluid contents in the container body. A passive base cup is made of foam and has a reflective layer on a majority of the outer surface thereof, or made of plastic, with an outer reflective layer, and optionally a foam layer. An active base cup serves to actively cool the fluid in the container, by including a compartment therein with a fluid that can be frozen. Again, a reflective layer and an optional foam layer extend over a majority of the outer surface of the cup. The reflective layer materials have a density different than the cup materials to facilitate recycling.

39 Claims, 7 Drawing Sheets

CONTAINER BASE CUP HAVING REDUCED HEAT GAIN

REFERENCE TO PRIOR-FILED APPLICATION

This application claims the benefit under 35 U.S.C. Section 119(e) of U.S. Provisional Patent Application Ser. No. 60/201,440, entitled PLASTIC CONTAINERS HAVING REDUCING HEAT GAIN AND GOOD RECYCLEABILITY, filed May 3, 2000, which is hereby incorporated by reference in its entirety into this application.

BACKGROUND OF THE INVENTION

1. Field of the Invention

The present invention relates to containers and, more particularly, to plastic fluid container base cups having reduced heat gain and good recycleability.

2. Background of the Invention

Of course, containers such as plastic bottles, are popular for beverages, such as soft drinks. After such a container is removed from the refrigerator, cooler, etc., the beverage undesirably begins to warm.

More particularly, heat is conducted from the surroundings, through the beverage container, and to the beverage contained therein by three primary modes of heat transfer. First, any difference in temperature between a container's surroundings (such as the air surrounding the container or the surface the container is placed on) and heat will be conducted through the container wall and enter the beverage by convection. Second, heat can also enter the container wall as a result of condensation of moisture from the air on the surface of the container. For each drop of water condensing on the surface, there is energy in the form of latent heat of condensation transferred to the container wall. Third, and the greatest source of heat to the container wall, is direct radiation from the sun and ground. For example, with a plastic bottle, thermal radiation easily penetrates the plastic bottle wall. As the radiation penetrates, it heats the plastic from within, as well as on its outer surface, further hastening the heating of the container contents.

SUMMARY OF THE INVENTION

Accordingly, it is a purpose of the present invention to provide a container capable of retaining the cold temperature of its contents for a longer period of time than the prior art.

It is another purpose of the present invention to provide a container, which retards heat gain caused by radiation, conduction, convection or condensation.

It is another purpose of the present invention to provide a container having an external reflective layer, which is capable of reducing heat gain caused by radiation.

It is another purpose of the present invention to provide a container that uses a foam layer to reduce heat gain caused primarily by convection, conduction, or condensation.

It is another purpose of the present invention to provide a passive base cup for receiving a bottom of a plastic beverage container for further reducing heat gain through radiation, conduction, and convection heating of the bottom and beverage contents.

It is still another purpose of the present invention to provide a beverage container active base cup which contains a freezable phase change fluid for receiving a bottom of the beverage container and further reducing heat gain through radiation, conduction and convection heating of the bottom and beverage contents.

It is also a purpose of the present invention to provide a method for forming a reduced heat gain container.

To achieve the foregoing and other purposes of the present invention, a container body bottom is received by a base cup. The container body can be a conventional plastic beverage container, or a plastic container having a layer that reflects radiation formed thereon, and optionally a foam layer with the reflective layer.

The base cup may be made of a polymer and have an outer reflective layer to further increase the thermal resistance of the container body. A foam layer can be placed over or under the reflective layer to further improve heat gain suppression. Alternatively, the base cup can be made of foam with a reflective layer thereon. A space inside the base cup may contain air, if the cup is to be a "passive" insulator for the bottom of the container body, or a fluid that can be frozen, to provide an "active" base cup.

The container body and base cup can still be efficiently recycled by using separation techniques based on density of the various materials. The materials of the reflective layer are selected to have a density less than 1 g/cc so that the reflective layer can be separated from the container body having a density greater than 1 g/cc. Alternatively, if the reflective material density is selected to be greater than 1 g/cc, then the addition of a foam layer can reduce the bulk density of the structure such that the combination has a density less than 1 g/cc. In addition, the passive base cup materials can be selected such that the density is less than 1 g/cc, or combined with foam to create a structure such that the combination has a density less than 1 g/cc. The inverse is true when the container body density is less than 1 g/cc.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described with reference to FIGS. 1–9.

The base cup according to the present invention may be used with a conventional plastic beverage container, such as a closeable, soft drink container. Alternatively, the base cup can be used with a container that is modified, as described below, to reduce heat gain to the contents of the container.

Figure 1:
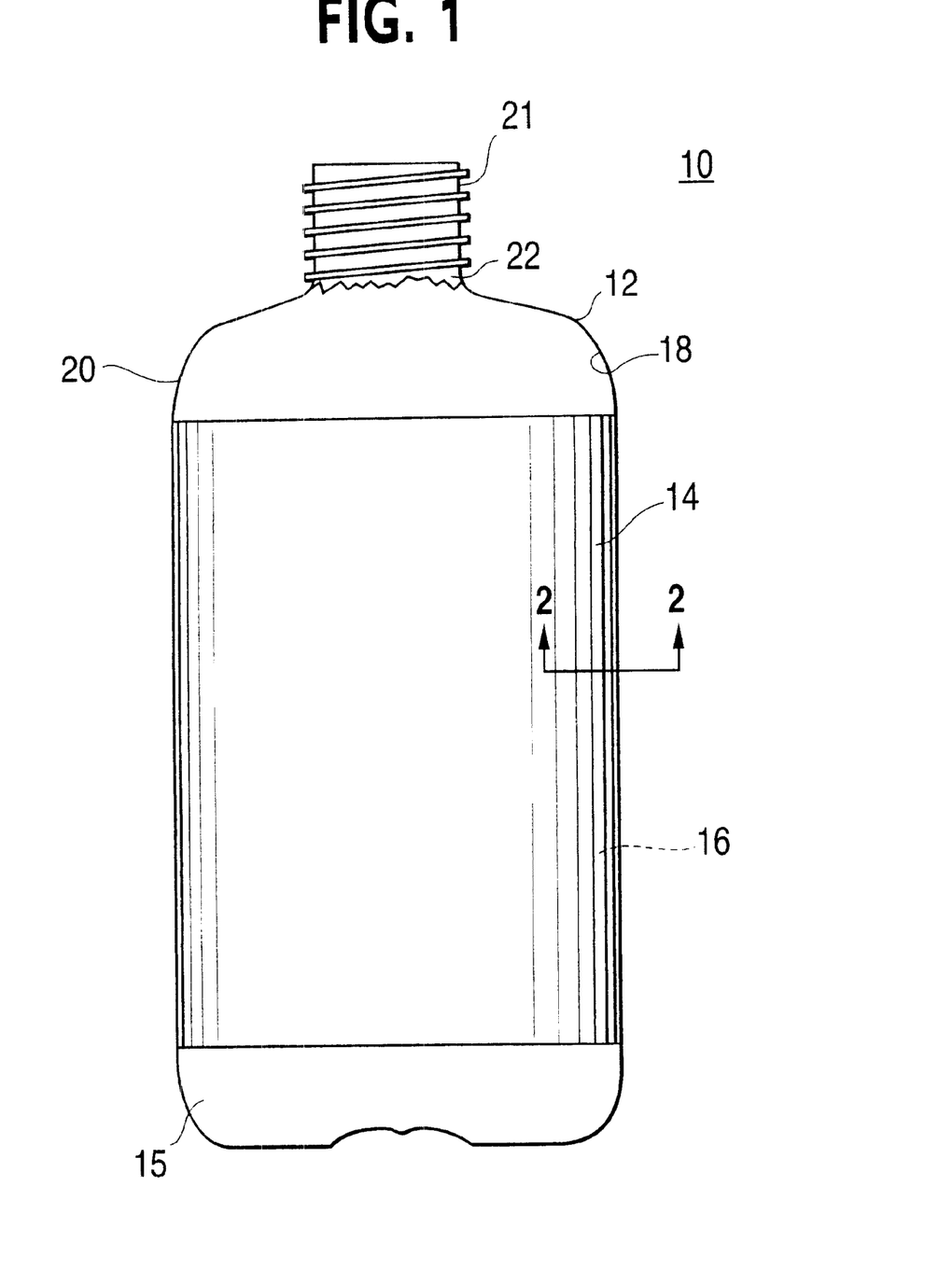
FIG. 1 is side view of a container body according to the present invention.
Figure 2:
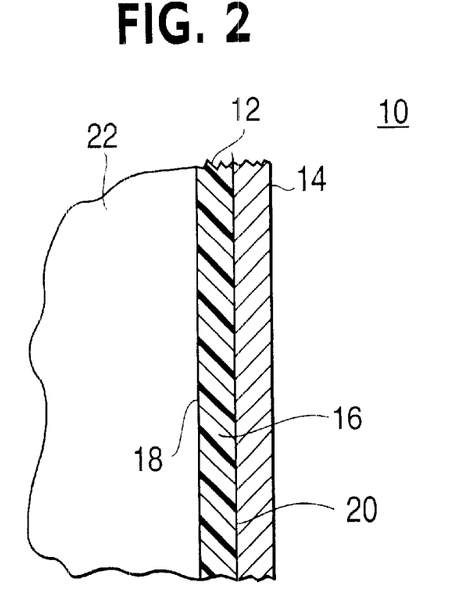
FIG. 2 is a cross sectional view of the sidewall of the container body shown in FIG. 1, taken along line 2—2.

FIGS. 1 and 2 show, in general, a container 10 including a container body 12 in the form of, e.g., a plastic bottle intended to contain a beverage 22, such as a soft drink. The body 12 has a bottom 15, a sidewall 16, an inner surface 18, and an outer surface 20. The container body 12 may also include a threaded neck 21 for receiving a cap (not shown). A reflective layer or label 14, capable of reducing heat gain through the container body 12, is formed on the outer surface 20 of the container body 12, as described below.

Container Body

The container described herein is also the subject of a co-pending application filed concurrently herewith, entitled CONTAINER HAVING REDUCED HEAT GAIN, the contents of which are expressly incorporated herein.

The container body 12 is preferably made from conventional polymeric materials such as polyesters, including any crystallizable polyester homopolymer or copolymer that is suitable for use in packaging, and particularly food packaging. Suitable polyesters are generally known in the art and may be formed from aromatic dicarboxylic acids, esters of dicarboxylic acids, anhydrides of dicarboxylic esters, glycols, and mixtures thereof.

Other suitable polymer materials for forming the container, as known in the art, include multilayer formulations, including: PET/MXD6 (polyamides)/PET, and PET/EVOH/PET. Such multilayer polymers are currently used to make, e.g., beer containers. Still other suitable known polymer materials include polycarbonates, polyolefins (HDPE, PP, LDPE, etc.), polystyrene and polyvinylchloride.

Also, conventional additives may be used, if desired. Such additives include, but are not limited to colorants, pigments, carbon black, glass fibers, fillers, impact modifiers, antioxidants, stabilizers, flame retardants, reheat aids, acetaldehyde reducing compounds, barrier aids, oxygen scavengers and the like.

The container body 12 is formed by a conventional process such as extrusion molding, and preferably stretch blow molding.

Reflective Layer

With reference particularly to FIGS. 1–2, the reflective layer 14 is applied over the outer surface 20 of container body 12. Since the sidewall 16 offers the largest surface area of the container body 12 that is directly exposed to radiative heat sources, it is preferred that the sidewall 16 be covered with the reflective layer 14, and less preferable that the reflective layer extend over to the neck 21 and/or the bottom 15 of the container body 12.

The reflective layer 14 should cover between about 50% to about 100% of the outer surface 20; preferably between about 75% to about 100%, and more preferably between about 85% to about 100%. Suitable materials for the heat reflective layer 14 include one or more of metal foil, metallized paper, metallized polymer film, and the like.

The reflective layer 14 can be applied to the outer surface 20 by known techniques, e.g., heat shrinking, stretching, pressure sensitive labeling, and adhesive. As known in the art, each type of application technique can affect the ability to efficiently recycle the container. Of course, advertising or other indicia can be applied to the exterior surface of the reflective layer 14.

The reflectivity of the reflective layer 14 should be greater than about 70%; preferably greater than about 90%, and more preferably greater than about 97%. Reflectivity is measured via industry standard methods such as ASTM E903-96 with a vacuum metallized film standard according to NIST.

The reflective layer 14 may be very thin and still provide significant decreases in heat gain from radiation. Reflective layers 14 which are less than about 5 mils thick, and even less than three mils thick, have been found significantly to reduce heat gain. This reduces the materials necessary to make the low heat gain container 10, which minimizes the effect of the container 10 on the recycle industry. In contrast, much thicker foam layers (0.009–0.010 inches, 9 to 10 mils) failed to significantly decrease heat gain.

There are several methods for producing the reflective layer 14. A reflective film can be made by adding metallic flakes or pigments to virgin plastic resins using standard extrusion processes. As known in the art, however, colored plastics can reduce recycle efficiency. Also, any modifications made to the plastic during an injection-molding step, would negatively impact a stretch blow-molding step that uses infrared radiation to heat the plastic.

Alternatively, direct printing of highly reflective metallic inks on paper or plastic can be used to create a suitable reflective layer 14. Again, as known in the art, if the reflective layer 14 is applied by painting or other coating techniques to the outer surface 20 of the container body 12 via, e.g., sputtering techniques, reclycleability may be negatively effected, depending upon the type of coating, its thickness, and the container geometry.

Likewise, plastic and paper can be solution coated with silver or aluminum. Preferably, the plastic or paper is metallized using a vacuum deposition process. In addition, white pigments can be added to films to create substrates that are reflective; however, the reflectivity will not be as great as with metallized substrates. When printing on any of the reflective substrates, inks which do not absorb in the infrared region are recommended.

Combinations of reflective layers 14 may be employed to gain greater cold retaining benefit. For example, a metallized low shrinkage wrap-around film or paper label with a reflective layer 14 could be used to cover a flat or paneled section of a container body 10, and a reflective layer 14 in the form of a shrink film metallized or printed with reflective inks could be utilized to cover a more curved sections of the container body 12, such as near the neck 21 or bottom 15. The shrinkage characteristic of the polymer film can be utilized to conform the label with reflective layer 14 to the container body 10 shape more readily.

Foam Layer on Container Body

The reflective layer 14 may be used either alone or in combination with other materials to enhance the heat gain reduction. In this regard, foam is the most practical and efficient material to satisfy the following two goals: reducing conductive heat gain, and facilitating recycling.

Figure 3A:
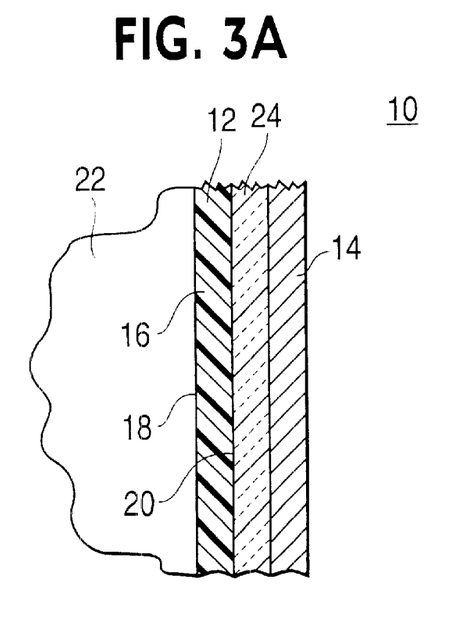
FIG. 3A is a side, cross sectional view of the sidewall of another container body according to the present invention.

FIG. 3A illustrates a second embodiment according to the present invention. As shown therein, a foamed film or layer 24 may be used with the reflective layer 14 to further reduce the temperature gain, particularly through the sidewall 16. The foamed layer 24 would preferably be disposed between the reflective layer 14 and the outer surface 20 of the container sidewall 16 to further impede heat absorption.

The density of the foamed layer 24 should be less than about 0.5 $g/cm^3$, and preferably less than about 0.2 $g/cm^3$.

The foamed layer 24 may be composed of a polystyrene-based homopolymer or copolymer, a polyolefin homopolymer or copolymer, polyester homopolymer or copolymer or any other foamable thermoplastic polymer.

The thickness of the foamed layer 24 may range from about 0.001 to about 0.080 inches, preferably from about 0.004 to about 0.020 inches.

Primarily, the reflective layer 14 functions to retard the heat gain through radiation in the environment, such as from the sun. In contrast, the foamed layer 24 seeks to retard the heat gain mostly from conduction, such as someone holding the container body 12 in their hand. In light of these different functions, the reflective layer 14 is most effective, i.e., reduces heat gain most, when, e.g., a beverage in a plastic container is being consumed in an outdoor environment where there is a substantial radiation source, such as the sun. When not in the presence of such a substantial radiation source, such as indoors, the reflective layer provides only marginal heat reduction relative to a conventional container, and otherwise serves only an aesthetic and/or labeling function (advertising indicia).

Figure 3B:
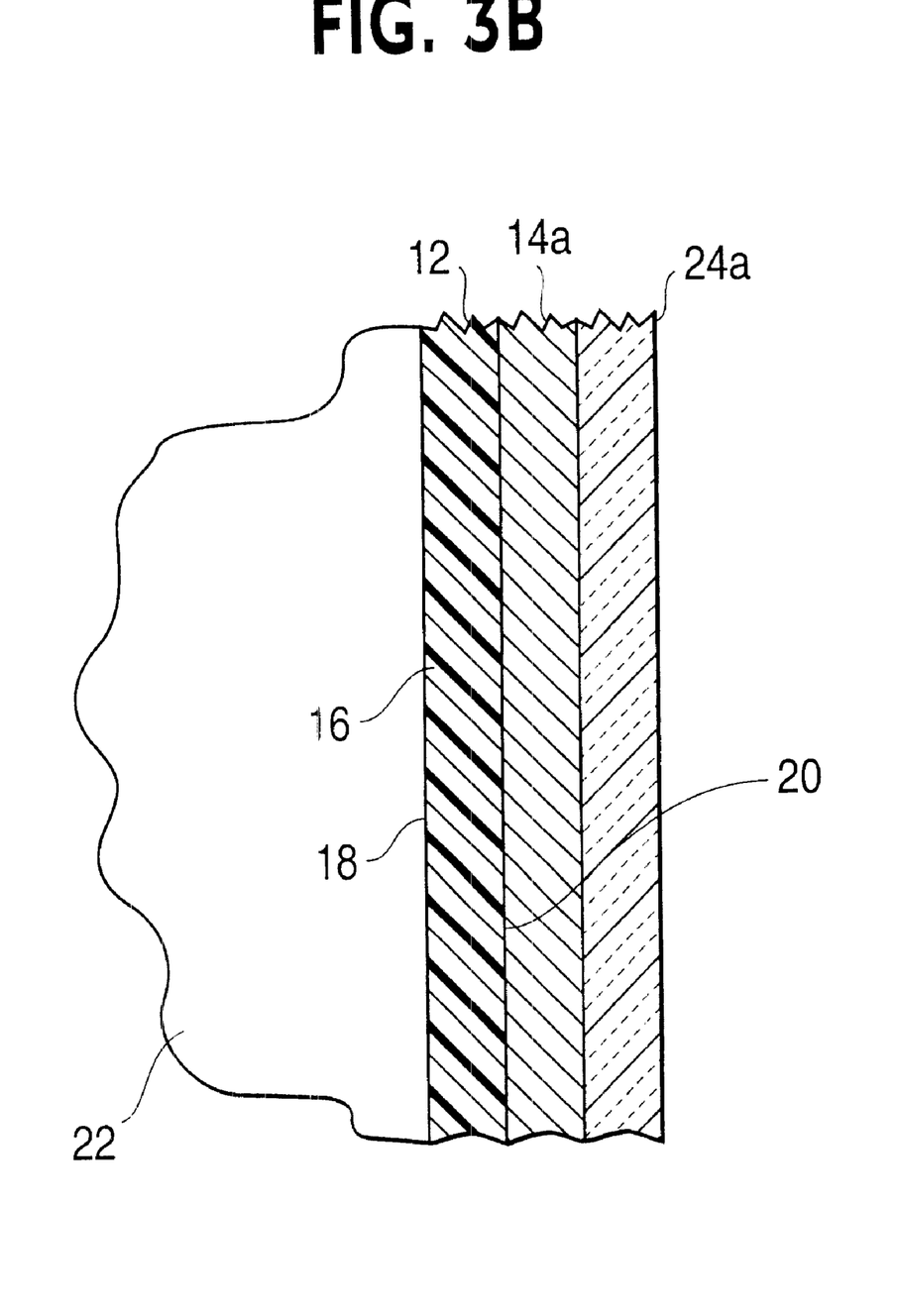
FIG. 3B is a side, cross-sectional view of the sidewall of still another container body according to the present invention.

As a third embodiment shown in FIG. 3B, a reflective layer 14a is applied directly to the outer surface 20 of the container body 12, and a foamed layer 24a is applied over the reflective layer 14a. Again, the foamed layer 24a retards heat gain by convection, and the reflective layer 14a minimizes heat gain from radiative sources.

Recycling

In general, the recycling process includes the following steps. The labeled bottles (e.g., PET) according to the present invention are sorted, crushed and ground to "flake". Using water separation techniques well known in the art, the reflective layer materials, which are of the lesser density float toward the top, whereas the PET materials sink. The reflective layer materials are then recovered separately from the PET materials.

From a recycling point of view, the foamed layer 24 can be added depending on the thickness and the type of reflective layer 14. For example, a foamed layer would be used if the reflective layer 14 were metallized paper or PET, instead of metallized polyethylene or propylene. That is, metallized polyolefins float in water (density less than 1) while PET will sink. On the other hand, metallized PET or paper, or any substrate having a density greater than 1, would tend to cause problems in the recycling water separation that would be alleviated by the addition of a foamed layer.

That is, the reflective layer 14 can be readily separated during conventional recycling from the container body 12 which is selected to have a density greater than about 1 g/cc.

In this way the lighter material, i.e., the reflective layer 14 on the foamed layer 24 can be floated to the top, relative to the heavier container body 12 material.

Base Cup Generally

Figure 4:
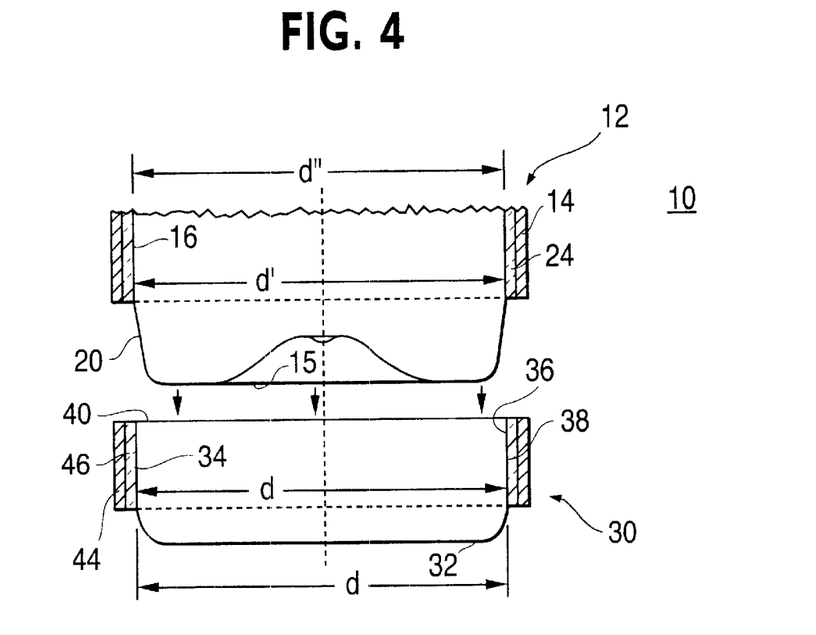
FIG. 4 is a side, cross-sectional view of the bottom of a container body and a polymeric, "passive" base cup according to a first embodiment of the present invention.
Figure 5A:
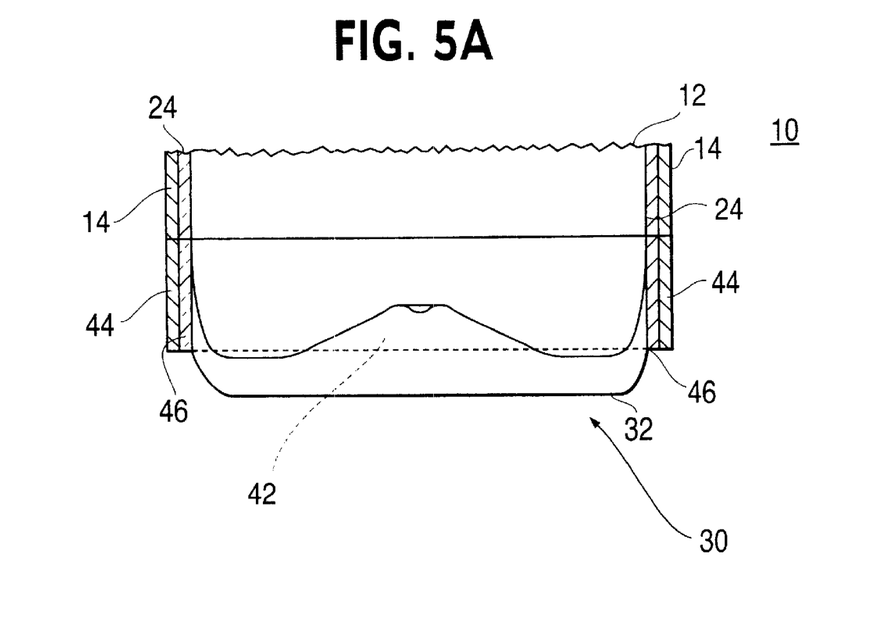
FIG. 5A is a side, cross sectional view of the bottom of the container body shown in FIG. 4 received in the passive base cup.
Figure 5B:
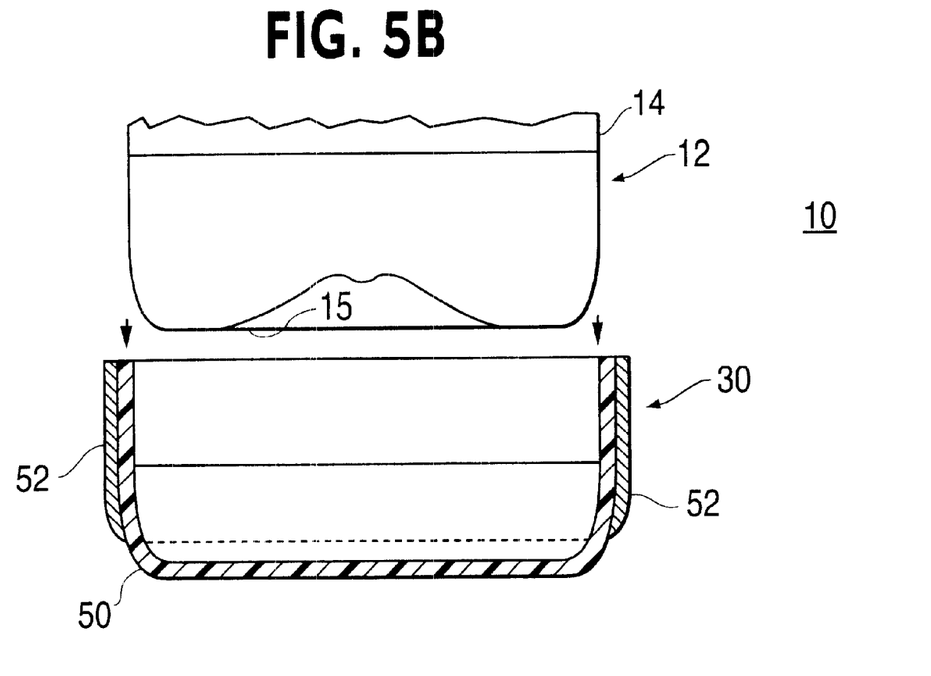
FIG. 5B is a side, cross-sectional view of a container body and a passive foam base cup according to a second embodiment of the present invention.
Figure 5C:
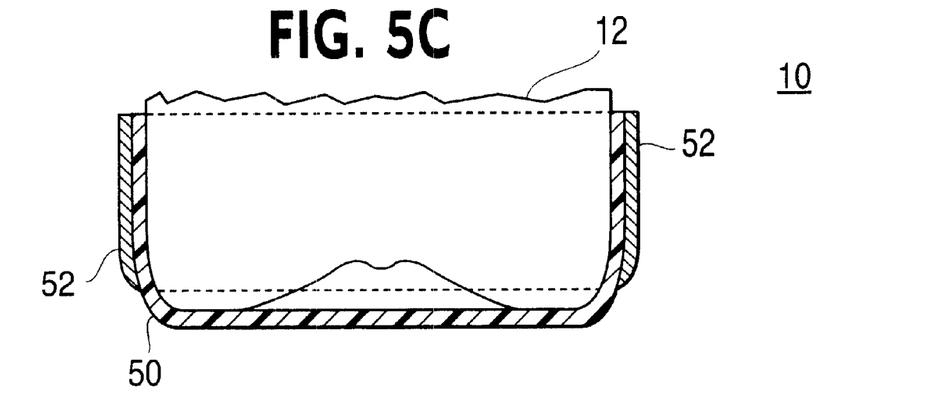
FIG. 5C is a side, cross-sectional view of the bottom of the container body shown in FIG. 5B received in the passive foam base cup.

The base cup can take the form of a "passive" base cup, as shown in FIGS. 4–5C, or an "active" base cup, as shown in FIGS. 6–9, and as described in greater detail below. By passive, it is meant that the base cup serves only to increase the thermal resistance of the container body and does not provide a cooling source. In contrast, the active base cup increases the thermal resistance of the container body and also provides a cooling source that actively cools the container body.

Passive Base Cup

FIGS. 4–5A show a first embodiment of the present invention including a container body 12, as described above, and a base cup 30 to be connected to the bottom 15 of the container body 12. The base cup 30 includes a bottom 32, a sidewall 34 with an inner surface 36 and an outer surface 38, and an open top 40.

This passive base cup should be made of a material with a density less than 1 g/cc and polyolefin in nature (PP, LDPE, HDPE, or LLDPE would be applicable). The base cup 30 can also be made using other polymers mixed with metallized flake and pigments during extrusion or injection molding.

As with the container body 12 discussed above, a reflective layer 44 can be applied over the outer surface 38 of the base cup 30. As noted above, the coverage of the reflective layer 44 relative to the area of the outer surface 38 of the base cup 30 should be greater than 50%, up to a preferable range of 85% to 100%. Also as above, the heat reflective layer should have a reflectivity of greater than about 70%; preferably greater than about 90%, and more preferably greater than about 97%.

As also shown in FIG. 4, the inner diameter d of the base cup 30 is such that its inner surface 36 fits over the outer surface 20 of the bottom 15 of the container body 12. The outer diameter d' of the container body 12 in the region covered by the base cup 30 may be reduced slightly relative to the container body 12 outer diameter d" in areas not covered by the base cup 30, such that the outer diameter d'". of the base cup 30 is equal to the outer diameter d" of the container body 12 in the uncovered area.

As can be seen in FIG. 5A, when the base cup 30 receives the bottom 15 of the container body 12 therein, air 42 is trapped therebetween. This trapped air 42 acts as a passive insulator, which further minimizes heat gain through the container body 12.

Again, as with the container body 12 described above, the passive base cup 30 can include a foamed layer 46, either under the reflective layer 44, as shown in FIGS. 4 and 5A (compare FIG. 3A), or on top of the reflective layer 44 (compare FIG. 3B). However, for the purposes of recycling, a reflective layer with a density of less than 1 g/cc does not require an additional foamed layer.

FIGS. 5B and 5C show a second embodiment of the present invention, wherein a passive base cup 50 is formed from a polymeric foam. The density of the foam is preferably less than about 0.5 $g/cm^3$ and more preferably less than about 0.2 $g/cm^3$. A reflective layer 52 can be applied directly to the exterior of the base cup 50.

The foam may be composed of a polystyrene-based homopolymer or copolymer, a polyolefin homopolymer or copolymer, a polyester homopolymer or copolymer, or any other foamable thermoplastic polymer, including specifically polyethylene terephthalate (PET), polypropylene, polystyrene or any combination thereof.

The thickness of the foam may range from about 0.01 to about 0.3 inches, preferably from about 0.02 to about 0.2 inches.

In these regards, the base cup 50 may be formed by any method known to those skilled in the art. These methods include in-mold foaming of expandable beads, post-extrusion forming of extruded foam sheet, injection molding, and the like. The preferred methods are in-mold foaming of expandable beads and post-extrusion forming of extruded foam sheet. In the latter case, the optional heat reflective layer 52 is preferably laminated prior to forming the base cup 50.

As the base cup 50 itself is made of foam, an additional foamed layer adjacent the reflective layer 52, such as described in previous embodiments, is not necessary.

Active Base Cup

Figure 6:
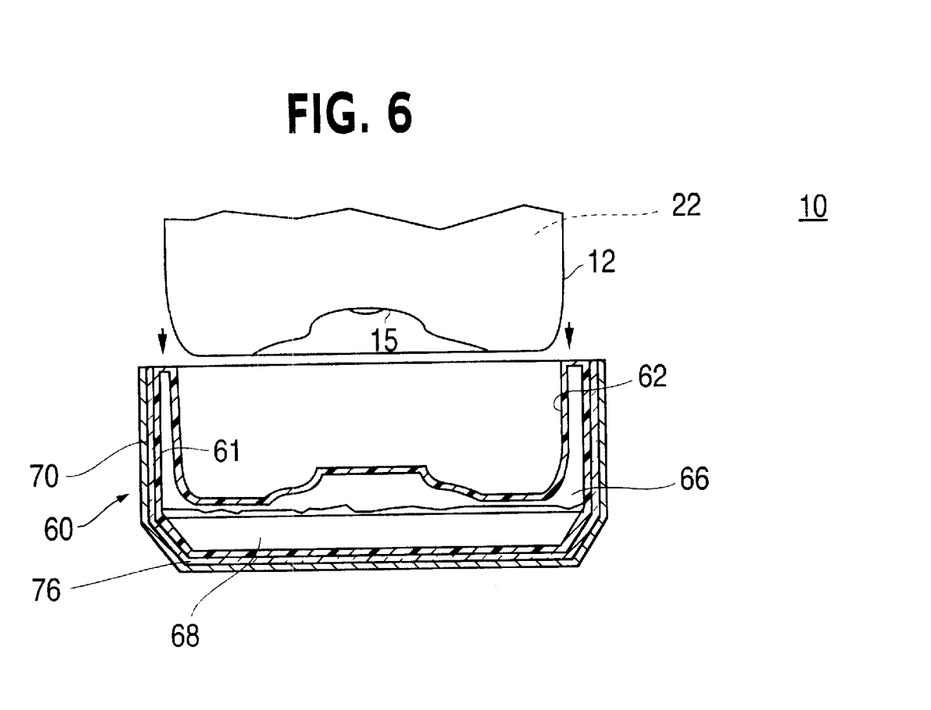
FIG. 6 is a side, cross sectional view of a container body and an "active" base cup according to a third embodiment of the present invention.
Figure 7:
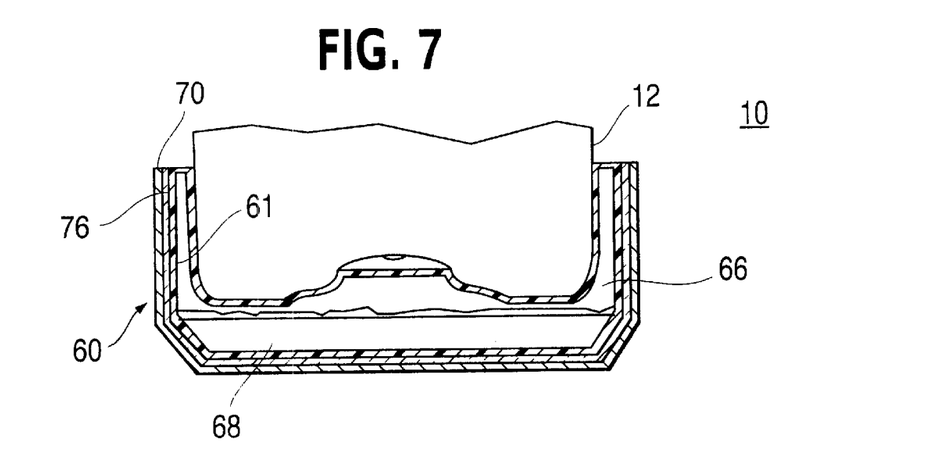
FIG. 7 is a side, cross sectional view showing the active base cup receiving the bottom of the container body shown in FIG. 6.

In yet another embodiment shown in FIGS. 6 and 7, an active base cup 60 includes a sidewall 61, an inner surface 62, an outer surface 64, a compartment 66, and a fluid 68 disposed in compartment 66.

This base cup 60 can be made of polypropylene, high-density polyethylene, or any other thermoplastic material, as discussed above. The compartment 66 therein can be formed by any method known by those skilled in the art, with injection molding being a preferred process.

The volume of the compartment 66 should scale with the container body bottom 15 size and also support the container body 12 to stand erect. For example, the volume of the compartment 66, for a 32 oz bottle with a 3.5-inch diameter, should be between 0.5 cubic inch and 2 cubic inches, more preferably 0.75 cubic inch and 1.5 cubic inches.

The fluid 68 should readily freeze (or change to a solid phase) at or above home freezer conditions. Suitable phase change fluids 68 are well known and are used in commercially available reusable freezer packs. Possible phase change fluids include, but are not limited to water, brine, water/ethylene glycol mixtures, mixtures thereof and the like. Preferably, the melting point of the selected phase change fluid is at or near the desired "end use" temperature. Typically this would be between ambient temperature and 32° F. depending on the particular beverage. The fact that the freezing point and the melting temperature are not necessarily the same is a result of the fact that most fluids have to be supercooled in order for freezing/crystallization to occur. It is important that the supercooling does not cause the freezing temperature to be so low that the consumer could not conveniently refreeze the phase change fluid.

The phase change fluid 68 may also include nucleators and/or impurities to bring the freezing and crystallization points closer together. These aid the formation of frozen crystals during cool down so that less supercooling is required. This active base cup 60 can be removed, frozen, and reapplied to the container body 12 such that it acts as a portable cooler for the container body 12. In this regard, this base cup 60 also can snap or screw directly onto the bottom 15 of the container body 12 by the methods described below.

The fluid 68 could also be chilled, but not frozen, and still offer active attributes to the base cup 60.

It is also possible to make the base cup 60 directly out of a polymer/material that will undergo phase change itself at the desired temperature, so that no compartment 66 need to be formed. Examples of such materials include polyisobutylene and polyethylene glycol. By proper choice of molecular weight, these polymers will have melting points between 32° F. and room temperature. These polymers would most likely have to be incorporated as a blend, or as a separate layer, with another structural polymer such as PET, HDPE, PC or other similar materials. However, with the proper molecular weight and morphology, a polymer like polyisobutylene might be rigid enough to be useable as a standalone phase change base cup 60 in contact with the bottom 15 of the container body 12.

The compartment 66 is not necessarily entirely full of fluid 68 so that heat has to make a leap across an air gap in the compartment 66, when moving axially upward. That is, heat would have to enter the reflective base cup 60, mostly via natural convection, pass through the polymer material of the base cup 60 sidewall 61, melt the frozen phase change fluid 68 in the compartment 66, pass through the remaining air gap in the compartment 66, pass through the wall forming the bottom 15 of the container body 12, and enter the beverage 22. This poses quite a resistance and initially has the effect of having heat pass from the beverage 22 to the chilled base cup 60. As the frozen phase change fluid 68 in the base cup 60 melts, the heat flow would be reversed.

The active base cup 60 would not necessarily be sold as a part of the container body 12. Instead, it could be sold separately, as with soft foam receptacles that are currently popular for use with beer cans. Such active base cups 60 would be reusable, and would have no need to be recyclable like the container body 12 or the passive cup 30, as described above.

The base cup 60 can, like the embodiments described above, be made reflective by adding a reflective layer 70 using the techniques previously described. As also shown in FIGS. 6 and 7, a foamed film or layer 76 may be used under the reflective layer 70 to further reduce the temperature gain, particularly through the sidewall 61 of the base cup 60. Alternatively, as described above, the reflective layer 70 can be applied directly to the container body 12, and the foamed layer 76 can be applied over the reflective layer 70, as shown in FIG. 3B for the container body 12.

The foamed layer 76 may be composed of the same homopolymers or copolymers, or any other foamable thermoplastic polymer, discussed above in relation to the foamed layer 24.

The thickness of the foamed layer 76 may again range from about 0.001 to about 0.080 inches, preferably from about 0.004 to about 0.020 inches.

As with the foamed layer 24 embodiment described above, the density of the reflective layer 70/foamed layer 76 combination should be less than about 1 g/cc, for recycling considerations, i.e., to provide improved separation during recycling. The density of the foamed layer 76 should preferably be less than about 0.5 g/cm$^3$ and is preferably less than about 0.2 g/cm$^3$. This enables the reflective layer 70 to be readily separated during conventional recycling from a container body 12 having a density greater than about 1 g/cc. In this way the lighter reflective layer 70/foamed layer 76 material can float to the top, relative to the heavier container body 12 material in a recycling process Attachment of Base Cup The passive base cup 30 is preferably secured to the container body 12 via a friction fit between adjoining surfaces. Alternatively, mechanical interlocking, such as screw fit, interference or snap fit, adhesive (such as an adhesive that dissolves in water to facilitate recycling), or any other method known to those skilled in the art, could be used, if desired.

Figure 8:
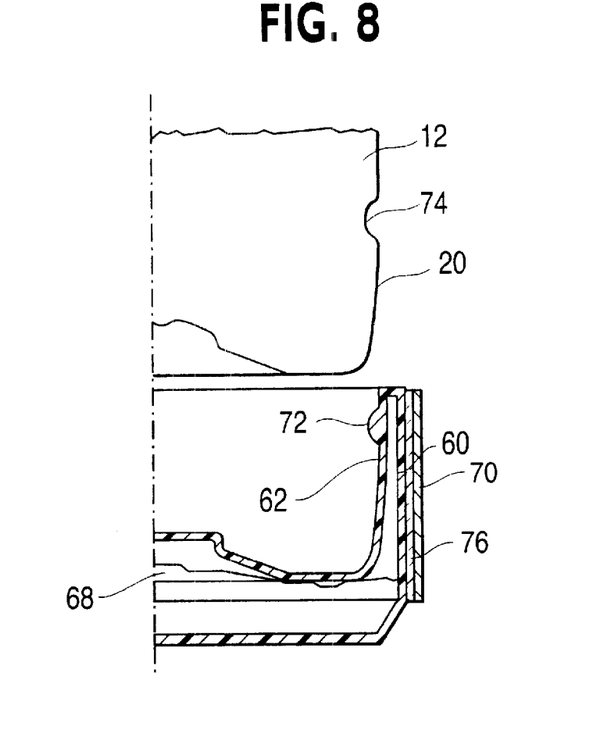
FIG. 8 is a side, cross sectional view of a container body bottom and an active base cup according to a fourth embodiment of the present invention, wherein each of the body and the base cup includes cooperating elements for removably connecting them together.
Figure 9:
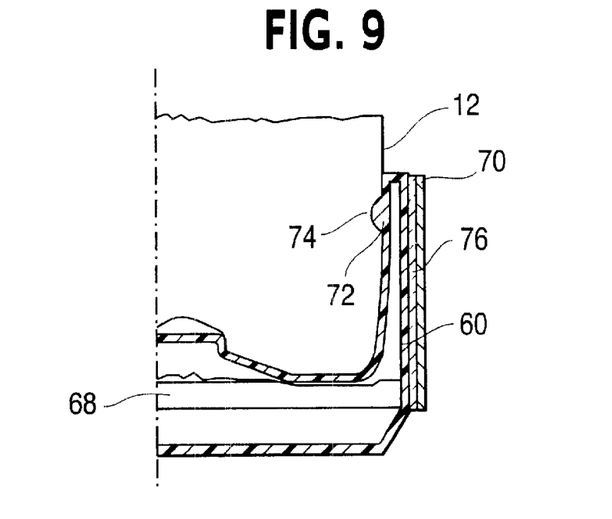
FIG. 9 is a side, cross sectional view of the container body received by the active base cup shown in FIG. 8.

For the active base cup 60, the method of attachment should be those described above that are easily removable (e.g., friction, or screw on). In this regard, FIGS. 8 and 9 illustrate a fourth embodiment according to the present invention. As shown, a circumferential projection 72 formed on the inner surface 62 of the base cup 60 engages, by an interference or snap fit, a corresponding circumferential recess 74, formed on the outer surface 20 of the container body 12. Of course, the projection 72 and recess 74 could be helical to allow a threaded removable engagement.

Again, the reflective layer 70, with or without the foamed layer 76, could be used with the attachment embodiment.

Due to the need to include a compartment 66 filled with the fluid 68, and the need for an easily removable attachment such as the projection/recess combination 72,74 described above, the active cup 60 is less cost-effective and less easy to use than the passive cup, which merely forms an insulative air gap between the bottom of the cup and the bottom of the container body.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Control Conventional Heat Up—Unlabeled PET Container

Samples of a 32 oz, 49.4 g polyethylene terephthalate container were acquired and tested. To simulate beverage heat up in an outdoor environment, an environmental chamber was controlled at the following conditions: 80° F. ambient conditions, circulating air source, brick floor, and infrared energy source. The infrared energy source was a 250-watt heat lamp mounted such that it was at a 50-degree angle to the test objects resting on the brick floor. The test objects were equilibrated to 40° F. in a small refrigerator for at least 12 hours prior to testing. The containers were allowed to rest directly on the floor. Temperature data was acquired over a 2-hour test period. This Control container tested with no label yielded an overall temperature gain of greater than 40° F.

EXAMPLE 2

Conventional BOPP Label

The 32 oz PET container was evaluated with a standard 2.2 mil biaxially oriented printed polypropylene label by the standard test procedure outlined in Example 1. This label was found to provide a temperature reduction of 2° F. to 4° F. compared to the container in example 1, when covering 40% to 75% of the container.

EXAMPLE 3

Beverage Heat Up—Metallic Label

Metallized substrates (1.4 mil metallized plastic films and 2.4 mil metallized paper) according to the present invention were tested on the standard 32 oz container according to the procedure outlined in Example 1. As the coverage area increased, the overall temperature gain decreased. At 25% coverage the label reduced the beverage temperature by 3° F.–4° F. compared to the Control, at 50% coverage a 7° F.–8° F. reduction was observed, at 75% the reduction was 10° F.–12° F., and at 100% coverage a 13–14° F. reduction in heat gain was observed.

EXAMPLE 4

Container with Foam Film and Metallized Paper Label

Samples of commercially available 0.009–0.010 inch polystyrene foam film were evaluated in combination with the metallized paper label by the standard test procedure outlined in Example 1. The combination label provided an additional temperature decrease of 1–2° F. at 75% coverage compared to the metallized label alone. In addition, when foam film was used in combination with metallized paper or metallized polyethylene terephthalate, the combination label floated to the top in a standard recycling process.

EXAMPLE 5

Passive Base Cup, Unlabeled Container

Passive base cups were evaluated by the standard test procedure outlined in Example 1.

A PET passive base cup served to isolate the base of a conventional 32 oz PET container from the floor by creating an air space between the container and the ground. The passive base cup was made by cutting the bottom off of a standard PET 2-liter container. For testing purposes, the cut portion of the 2-liter container was then turned upside down such that the 32 oz PET container sat directly on the top of the base cup. This design created the desired air gap thereunder for evaluation. The passive base cups evaluated had the following volumes: 140 ml (air gap of ~0.75"), 260 ml (air gap of 1 ⅞"), and 350 ml (air gap of 3 ¼"). In comparison to the Control, the 0.75" air gap reduced the beverage temperature by 3–4° F., the 1 ⅞" air gap reduced the temperature by 5–6° F., and the 3 ¼" air gap reduced the temperature by 8–9° F.

EXAMPLE 6

Active Base Cup, Unlabeled Container

Active base cups were evaluated by the standard test procedure outlined in Example 1.

The active base cup was fabricated by cutting sections from a standard 2-liter container. The sections were then filled with various volumes of water and frozen in a standard freezer. These frozen ice plugs served as the active element of the base cups. The active base cups evaluated had volumes of (60 ml, 100 ml, and 150 ml). The 60 ml base cup reduced the beverage temperature by 5–6° F., the 100 ml by 12–13° F., and the 150 ml by 15–16° F.

EXAMPLE 7

Active Base Cup, Reflective Labeled Container

Active base cups in combination with reflective labels were evaluated by the standard test procedure outlined in Example 1.

The 100 ml active base cups as described in Example 6 were evaluated in combination with the reflective label embodiment of the container body 12 described above. A 100 ml active base cup was evaluated on 32 oz containers covered by 50% with a reflective label. The combination of the 50% reflective label with the 100 ml base cup reduced the beverage temperature by 20–21° F. A 100 ml active base cup was evaluated on 32 oz containers covered by 100% with a reflective label. The combination 100% reflective label with the 100 ml base cup reduced the beverage temperature by 25–26° F. This data is consistent with previous results showing that a 50% reflective label alone reduces the temperature by 7–8° F., and a 100% reflective label alone reduces the temperature by 12–14° F. The additional decrease in temperature comes from the 100 ml base cup, ~12–13° F.

EXAMPLE 8

Active "Reflective" Base Cup, Reflective Labeled Container

Active reflective base cups in combination with reflective labels were evaluated by the standard test procedure outlined in Example 1.

A 32 oz container covered by a 100% reflective label was evaluated with the following active base cups: 100 ml, 150 ml, and 200 ml. The base cups were also made reflective by labeling with metallized films. The combination of a reflective container and reflective base cup reduced the temperature considerably. The overall reduction for the combination of a 100 ml reflective active base cup and 100% reflective label was 25–26° F. The overall reduction for the combination of a 150 ml reflective active base cup and 100% reflective label was 28–29° F. The overall reduction for the combination of a 200 ml reflective active base cup and 100% reflective label was 29–30° F.

EXAMPLE 9

32 oz Water Bottles, Active Base Cup

Active reflective base cups in combination with reflective labels were evaluated by the standard test procedure outlined in Example 1 on a different container, a 32 oz water bottle container.

The water bottle evaluated had a similar base thickness to the 32 oz standard container but the sidewall thickness was a litter thinner at 12 mils compared to 15 mils for the standard test container. In addition, the container diameter was 3" vs. 3 ¼" for the standard container. The height of the water bottle was 9 ½" vs. 8 ½" for the standard container. The water bottles were evaluated using 60 ml and 150 ml active base cups on non-labeled containers. The overall temperature reduction observed for the 60 ml base cup on the 32 oz water bottle was 3–4° F., while the temperature reduction for the 150 ml base cup was 10–12° F. This data shows that the temperature reduction observed on one container is not directly transferable to another; however, the present invention still reduces the overall temperature gain in the container compared to the Control.

EXAMPLE 10

32 oz Water Bottles, Reflective Label, Active Base Cup

Active base cups in combination with reflective labels were evaluated by the standard test procedure outlined in Example 1 on the 32 oz water bottles described in Example 9.

The water bottle was covered with a 100% reflective label and tested with the following active base cups: 100 ml, 150 ml, and 200 ml. The combination of a 100% reflective label and a 100 ml active base cup on a 32 oz water bottle reduced the temperature by 20–21° F. The combination of a 100% reflective label and a 150 ml active base cup on a 32 oz water bottle reduced the temperature by 24–25° F. The combination of a 100% reflective label and a 200 ml active base cup on a 32 oz water bottle reduced the temperature by 30–31° F.

EXAMPLE 11

Unlabeled 20 oz Carbonated Soft Drink Containers, Active Base Cups

Active base cups were evaluated by the standard test procedure outlined in Example 1 on unlabeled 20 oz carbonated soft drink containers.

The 20 oz carbonated soft drink container had a diameter of 2 ¼" and a height of 8.5". The container was evaluated with the following base cup sizes: 60 ml, 100 ml, and 200 ml. The addition of the base cup reduced the overall temperature of the carbonated soft drink container as well. The 60 ml active base cup reduced the beverage temperature by 1–2° F., the 100 ml base cup reduced the temperature by 5–6° F., and the 200 ml base cup reduced the beverage temperature by 13–14° F.

The foregoing is considered illustrative only of the principles of the invention. Further, since numerous modifications and changes will readily occur to this skilled in the art, it is not desired to limit the invention to the exact constructions and operation shown and described. Accordingly, all suitable modifications and equivalents may be resorted to that fall within the scope of the invention and the appended claims.

We claim:

1. A base cup for receiving a bottom of a container body including the bottom and a sidewall, and containing a fluid therebetween, comprising:
   a cup including a bottom, an inner surface for receiving only the bottom of the container body, an outer surface, and a reflective layer having a reflectivity of at least about 70%, and being over at least 50% of the outer surface of the cup for reducing heat gain of the fluid.

2. The base cup as recited in claim 1, further comprising:
   a compartment containing at least one of a phase change fluid and air, the compartment being located between the bottom of the cup and the bottom of the container body.

3. The base cup as recited in claim 1, wherein the cup and the container body are removably connected.

4. The base cup as recited by claim 3, wherein the base cup and the container body are removably connected by one of mechanical interlocking and adhesive.

5. The base cup as recited in claim 1, wherein the cup is made of polymeric material.

6. The base cup as recited in claim 1, wherein the cup is made of foam.

7. The base cup as recited in claim 5, wherein the polymeric material of the cup includes one of polyisobutylene and polyethylene glycol.

8. The base cup as recited in claim 1, wherein a reflectivity of the reflective layer over the cup is 70% to 100%.

9. The base cup as recited in claim 1, wherein a reflectivity of the reflective layer over the cup is greater than about 90%.

10. The base cup as recited in claim 1, wherein a reflectivity of the reflective layer over the cup is greater than about 97%.

11. The base cup as recited in claim 1, wherein the reflective layer is over 85% to 100% of the outer surface of the cup.

12. The base cup as recited in claim 1, wherein the reflective layer over the cup is less than about 5 mils thick.

13. The base cup as recited in claim 1, wherein a density of the cup is different than a density of the reflective layer over the cup.

14. The base cup as recited in claim 1, wherein a foam layer is interposed between the outer surface of the cup and the reflective layer over the cup.

15. The base cup as recited in claim 1, wherein one surface of the reflective layer over the cup contacts the outer surface of the cup, and a foam layer is applied to an opposite surface of the reflective layer.

16. A base cup for receiving a bottom of a container body including the bottom and a sidewall, and including fluid therebetween, comprising:

a polymeric cup including a bottom, a sidewall, an inner surface for receiving only the bottom of the container body, an outer surface, and a reflective layer having a reflectivity of at least 70% and being over at least 50% of the outer surface of the sidewall of the cup.

17. The base cup as recited in claim 16, wherein the cup further comprises:

a compartment containing at least one of a phase change fluid and air, the compartment being located between the bottom of the cup and the bottom of the container.

18. The base cup as recited in claim 16, wherein the cup is made from a polymeric material including one of polyisobutylene and polyethylene glycol.

19. The base cup as recited in claim 16, wherein a foam layer is attached to the reflective layer over the cup.

20. The base cup as recited in claim 19, wherein said foam layer has a density of less than about 0.5 g/cm³.

21. The base cup as recited in claim 17, wherein said phase change fluid is selected from water, brine, water/ ethylene glycol mixtures and mixtures thereof.

22. A method for forming a base cup that receives a bottom of a container body including the bottom and a sidewall, and containing a fluid therebetween, comprising the steps of:

forming a cup including a bottom, an inner surface for receiving only the bottom of the container body, an outer surface, and a layer having a reflectivity of at least 70% over at least 50% of the outer surface of the cup for reducing heat gain of the fluid.

23. The method as recited in claim 22, wherein the cup is formed to include a compartment containing at least one of a phase change fluid and air, and being located between the bottom of the cup and the bottom of the container body.

24. The method as recited in claim 22, wherein the cup is formed from a polymeric material including one of polyisobutylene and polyethylene glycol.

25. The method as recited in claim 22, further comprising the step of removably connecting the cup and the container body.

26. The method as recited in claim 25, wherein the removably connecting step includes the step of forming one of a mechanical interlock and adhesive connection between the base cup and the container body.

27. The method as recited in claim 22, wherein the cup is chosen to be a polymeric material.

28. The method as recited in claim 22, wherein the cup is chosen to be foam.

29. The method as recited in claim 22, wherein the reflective layer over the outer surface of the cup is chosen to be at least one of the group comprising metal foil, metallized paper and metallized polymer.

30. The method as recited in claim 22, wherein a reflectivity of the reflective layer over the outer surface of the cup is chosen to be greater than about 90%.

31. The method as recited in claim 22, wherein a reflectivity of the reflective layer over the outer surface of the cup is chosen to be greater than about 97%.

32. The method as recited in claim 22, wherein the reflective layer is chosen to be over between 75% and 100% of the outer surface of the cup.

33. The method as recited in claim 22, wherein the reflective layer is chosen to be over 85% to 100% of the outer surface of the cup.

34. The method as recited in claim 22, wherein the reflective layer over the outer surface of the cup is chosen to be less than about 5 mils thick.

35. The method as recited in claim 22, wherein a density of the cup is chosen to be different than a density of the reflective layer over the cup.

36. The method as recited in claim 22, further comprising the step of interposing a foam layer between the outer surface of the cup and the reflective layer over the cup.

37. The method as recited in claim 22, wherein the reflective layer over the cup is formed to include one surface contacting the outer surface of the cup, and an opposite surface which receives a foam layer thereon.

38. The method as recited in claims 37, wherein the foam layer formed over the cup has a density of less than about 0.5 g/cm³.

39. The method as recited in claim 23, wherein said phase change fluid is selected from water, brine, water/ethylene glycol mixtures and mixtures thereof.

* * * * *

UNITED STATES PATENT AND TRADEMARK OFFICE
CERTIFICATE OF CORRECTION

PATENT NO.   : 6,474,499 B2
DATED        : November 5, 2002
INVENTOR(S)  : Michael E. Donelson et al.

It is certified that error appears in the above-identified patent and that said Letters Patent is hereby corrected as shown below:

<u>Title page,</u>
Item [56], U.S. PATENT DOCUMENTS, insert U.S. Patent Numbers
-- 5,353,985; 5,928,741 and 3,993,609 --

Signed and Sealed this

Twenty-seventh Day of May, 2003

JAMES E. ROGAN
*Director of the United States Patent and Trademark Office*